US 6,559,881 B1

United States Patent
Vooi-Kia et al.

(10) Patent No.: US 6,559,881 B1
(45) Date of Patent: May 6, 2003

(54) VIDEO TELECOMMUNICATIONS DEVICE, AND CAMERA FOR SAME

(75) Inventors: Tan Vooi-Kia, Tokyo (JP); Tang Lung Yee, Singapore (SG); Nir Karasikov, Haifa (IL); Ze'ev Ganor, Meir Herzlia (IL); Alon Avital, Haifa (IL); Hovav Elhayani, Yokneam Illit (IL)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/905,986

(22) Filed: Jul. 17, 2001

(51) Int. Cl.$^7$ ................................................. H04N 7/14
(52) U.S. Cl. ................................. 348/14.08; 348/14.01; 348/14.05
(58) Field of Search ...................... 348/14.01, 14.02, 348/14.03, 14.04, 14.05, 14.07, 14.08, 14.09, 14.11, 14.12, 14.13; 455/550, 556, 566; H04N 7/14

(56) References Cited

U.S. PATENT DOCUMENTS

| 5,616,980 A | * | 4/1997 | Zumeris | 310/323 |
| 5,864,363 A | * | 1/1999 | Giefing et al. | 348/143 |
| 6,064,421 A | * | 5/2000 | Pohl | 348/14.01 |

FOREIGN PATENT DOCUMENTS

| JP | 407111640 A | * | 4/1995 | H04N/7/14 |
| JP | 408205111 A | * | 8/1996 | H04N/7/14 |
| JP | 10-297309 | | 10/1998 | |
| JP | 11-117291 | | 4/1999 | |
| JP | 2000-051375 | | 2/2000 | |

OTHER PUBLICATIONS

Marasovich et al.; Method and Apparatus . . . video–conference equipment; Mar. 31, 1994; WO 94/07327.*

* cited by examiner

Primary Examiner—Melur Ramakrishnaiah
(74) Attorney, Agent, or Firm—Antonelli, Terry, Stout & Kraus, LLP

(57) ABSTRACT

A video telecommunications device and a camera unit for a video telecommunications device. A camera is mounted on the telecommunications device by a motor capable of rotating the camera on the telecommunications device. A position sensor senses the rotational position of the camera on the telecommunications device, and a position control input device enables provision of a control signal indicating a desired rotational position for the camera on the telecommunications device. A controller that is responsive to the control signal and the sensed position of the camera causes the motor to rotate the camera so as to position the camera in the desired rotational position on the telecommunications device, providing the desired video picture. A telecommunications coupler couples the camera unit to the telecommunications device, enabling the telecommunications device to communicate the image sensed by the camera lens to a receiving telecommunications device.

13 Claims, 3 Drawing Sheets

VIDEO TELECOMMUNICATIONS DEVICE, AND CAMERA FOR SAME

FIELD OF THE INVENTION

The present invention pertains to a camera unit for a telecommunications device and to a video telecommunications device.

BACKGROUND OF THE INVENTION

Video telecommunications devices are available with fixedly mounted cameras which must be manually positioned so that the camera lens senses a desired image. While such video telecommunications devices are well suited for use in situations in which the object of which the image is desired remains within a relatively small area, for example a witness testifying in a video-telephonic deposition, in many situations in which it is desired to have a video telecommunication capability the object of which the video image is desired might change. For example, it might be desired to provide a video telecommunication capability of a technical conference at which several people are to speak from different locations within the conference room, or at which questions are to be taken from audience members. Such a situation requires rotation of the camera to position the camera lens so as to sense the desired image. With a fixed camera, such usage is very difficult, if not wholly impractical.

Many telephone conversations are accomplished using wireless telephones. Such wireless phones are considerably smaller than desk phones. To provide a video capability with a wireless phone requires a small, low power, lightweight camera. The ability to rapidly and smoothly rotate such a camera so as to readily obtain the intended image is also desirable.

SUMMARY OF THE INVENTION

The present invention is a video telecommunications device and a camera unit for a video telecommunications device. A camera is mounted on the telecommunications device by a motor capable of rotating the camera on the telecommunications device. A position sensor senses the rotational position of the camera on the telecommunications device, and a control device enables provision of a control signal indicating a desired rotational position for the camera on the telecommunications device. A controller that is responsive to the control signal and the sensed position of the camera causes the motor to rotate the camera so as to position the camera in the desired rotational position on the telecommunications device. Accordingly, the desired video picture can be obtained. A telecommunications coupler couples the camera unit to the telecommunications device, enabling the telecommunications device to communicate the image sensed by the camera lens to a receiving telecommunications device. Thus, improved video conferencing is possible.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF PREFERRED EMBODIMENTS

Figure 1:
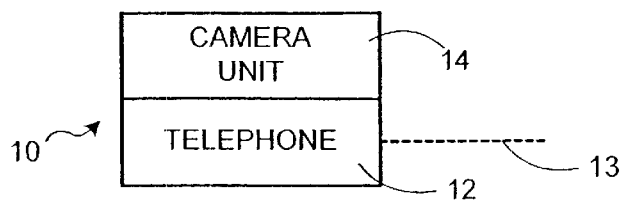
FIG. 1 is a diagrammatic depiction of a video telecommunications device in accordance with a preferred embodiment of the present invention.

FIG. 1 is a diagrammatic depiction of a video telecommunications device 10 in accordance with a preferred embodiment of the present invention. Video telecommunications device 10 includes a telephone 12 and a video camera unit 14. Telephone 12 permits communication over a telephone connection 13 to another telephone, as is well known. Telephone 12 might be a wireless phone such as a cell phone, or a landline phone such as a desk phone or a wall phone. Video camera unit 14 senses a video image that is transmitted over the telephone connection together with audio or data from telephone 12, providing a video telecommunications capability.

Figure 2:
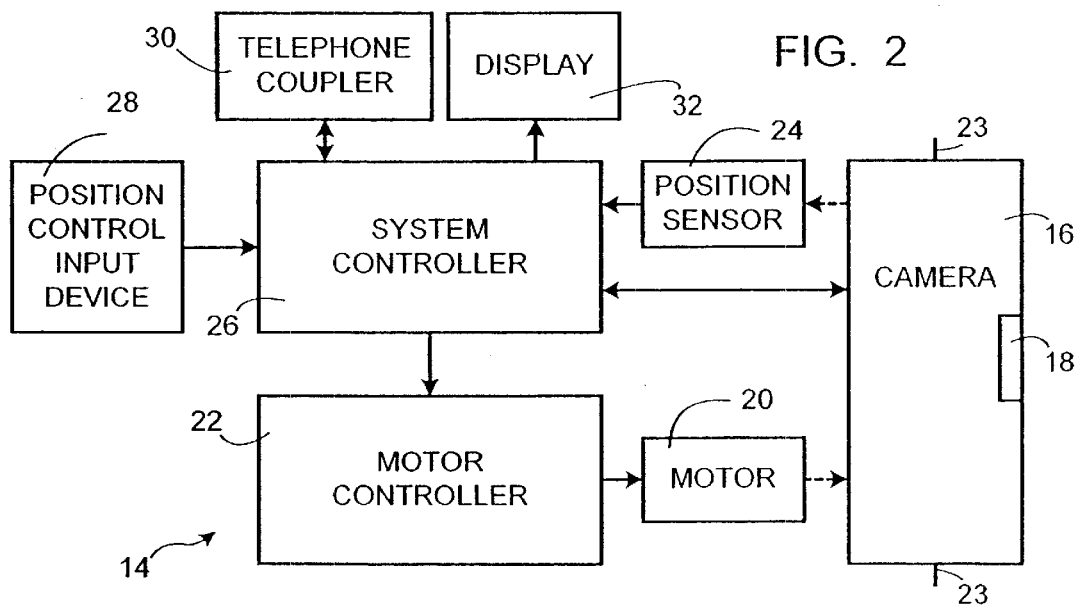
FIG. 2 is a block diagram of a first embodiment of a camera unit suitable for use in the video telecommunications device of FIG. 1 in accordance with the present invention.

FIG. 2 is a block diagram of a first embodiment of a camera unit 14 in accordance with the present invention. Camera unit 14 includes a video camera 16 having a lens 18 to sense an image. Camera 16, which for example might be a CCD camera or a CMOS camera, is mounted on a motor 20 which, in turn, is mounted on the telecommunications device, such as telephone 12. Motor 20 is coupled to motor controller 22. Under the control of motor controller 22, motor 20 is capable of rotating camera 16 about a shaft 23 on telephone 12. A position sensor 24 senses the rotational position of camera 16 on telephone 12. A system controller 26 is connected to camera 16, motor controller 22, and position sensor 24. System controller 26 receives position signals from position sensor 24 and control signals from a position control input device 28. In response to the control signals and the sensed camera position, system controller 26 instructs motor controller 22 to cause motor 20 to rotate camera 16 until the position signals from position sensor 24 indicate that the camera has rotated to the desired rotational position as indicated by the signals from position control input device 28.

A telephone coupler 30 connects system controller 26 to telephone 12 to permit transmission of the visual images sensed by lens 18 and the sensor of camera 16 over the telephone connection to a receiving video telecommunications device at a remote location and receipt of visual images from that remote telecommunications device. A video display device 32, such as a thin film transistor display device or a liquid crystal display device, is connected to system controller 26. Display device 32 thus can display images sensed by a camera unit on the telecommunication device at the remote location. Additionally, display device 32 can display the image sensed by lens 18 and the sensor of camera 16 so as to assure that the image is properly positioned and focused.

Figure 3:
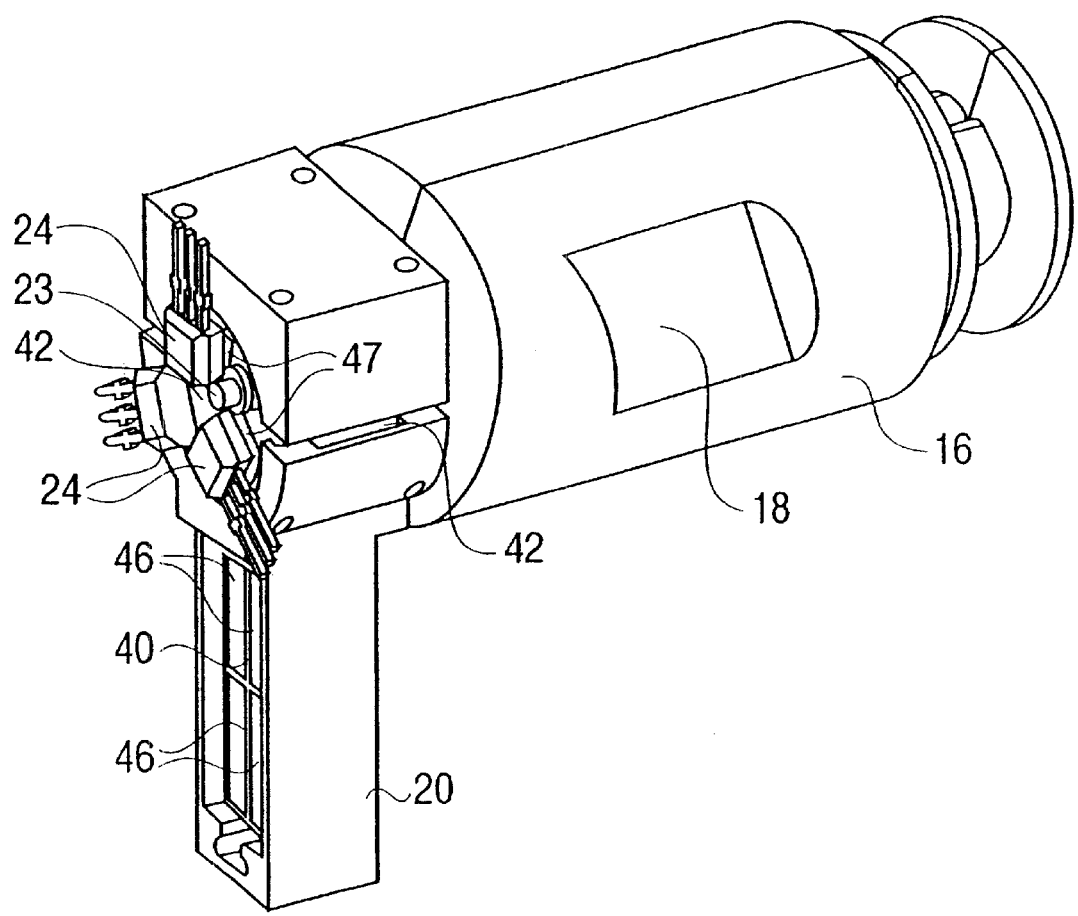
FIG. 3 is a perspective view of a first embodiment of a camera, motor, and position sensor assembly suitable for use in the video telecommunications device of FIG. 2 in accordance with the present invention.

FIG. 3 is a perspective view of a first embodiment of a camera, motor, and position sensor assembly suitable for use in camera unit 14 in accordance with the present invention. Camera 16 has a cylindrical housing with a lens 18 in the cylindrical side thereof. In the embodiment of FIG. 3, motor 20 is a ceramic motor having a shaft 23 on which the cylindrical housing of camera 16 is mounted, permitting the camera to rotate about that shaft, and so changing the rotational position of lens 18. By way of example, ceramic motor 20 might be a motor of the type depicted in U.S. Pat. No. 5,714,833, issued Feb. 3, 1998, the disclosure of which is incorporated herein by reference. Ceramic motor 20 includes a rectangular piezoelectric ceramic 40 and a disk 42. From one end of piezoelectric ceramic 40 a spacer or fingertip (not shown) extends radially with respect to disk 42 to contact the circumferential surface of disk 42. The housing of camera 16 is mounted by shaft 23 on disk 42.

Piezoelectric ceramic 40 has a planar surface with a set of four electrodes 46 mounted thereon, on the upper right, upper left, lower right, and lower left quadrants of the planar surface. When a high frequency ac voltage, for example a voltage of 40 kHz, is applied across a first diagonally opposite pair of the electrodes 46, the piezoelectric effect results in an oscillatory mode of longitudinal extending and transverse bending of piezoelectric ceramic 40. This causes the fingertip to move in a small elliptical path, causing the fingertip to repeatedly push and release disk 42, rotating the disk, and so rotating camera 16. Preferably, disk 42 has one or more radial stripes 47 on its surface. Position sensor 24 can then be a set of optical sensors, for example three optical sensors, mounted adjacent that surface of disk 42 to sense the stripes 47 as they rotate to positions beneath the sensors. If the ac voltage is applied across the other pair of diagonally opposite electrodes on piezoelectric ceramic 40, the fingertip moves in a small elliptical path in the other direction, causing the fingertip to rotate disk 42, and thus camera 16, in the opposite direction. Accordingly, camera 16 can be caused to rotate to a desired position.

To rotate camera 16, position control input device 28, which might be a simple pushbutton, is actuated, applying a brief control signal to system controller 26. System controller 26, in turn applies a signal to motor controller 22, causing the motor controller to actuate motor 20, rotating disk 42 and camera 16 about shaft 23.

When it is desired to rotate camera 16 a small rotational amount, position control input device 28 is actuated for a brief time, less than a predetermined time t. In response system controller 26 applies a signal to motor controller 22 causing the motor controller to actuate motor 20 to rotate camera 16 by a small amount. Repeated actuations of position control input device 28 cause camera 16 to rotate in small steps to a desired position, with the number of actuations of motor 20 determining the amount of rotation of disk 42 and camera 16. Position sensor 24 can apply count signals to a memory within position controller 26 to keep a record of the rotational position of lens 18.

When it is desired to rotate camera 16 to a predetermined position, position control input device 28 is actuated for a longer time, greater than predetermined time t. In response system controller 26 applies a signal to motor controller 22 causing the motor controller to actuate motor 20 to rotate camera 16 to that position, as determined by position sensor 24.

Figure 4:
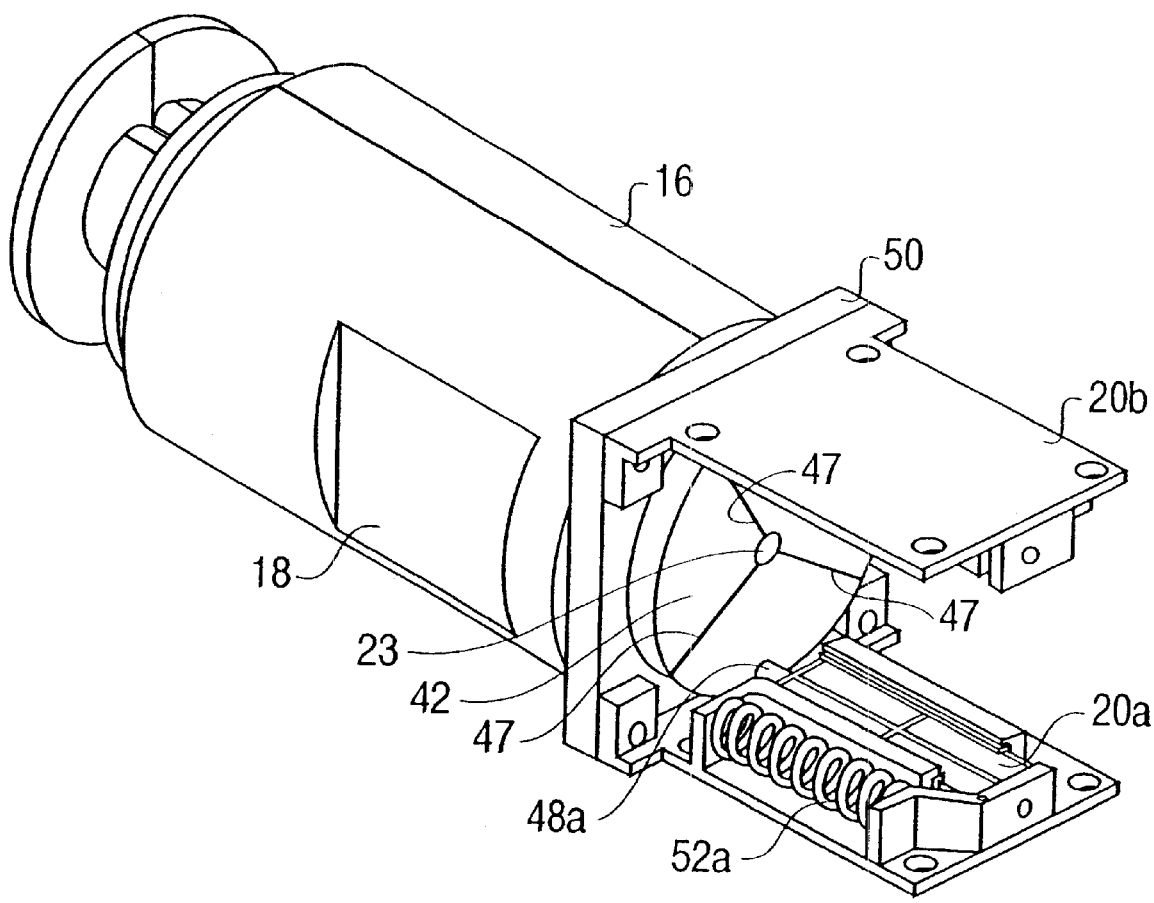
FIG. 4 is a perspective view of a second embodiment of a camera, motor, and position sensor assembly suitable for use in the video telecommunications device of FIG. 2 in accordance with the present invention.

FIG. 4 is a perspective view of a second embodiment of a camera and motor, suitable for use in the present invention, the sensor assembly having been omitted from the figure for clarity. First and second ceramic motors 20a, 20b are mounted on diametrically opposite sides of disk 42. Fingertip 48a of ceramic motor 20a extends radially with respect to disk 42, substantially parallel with shaft 23 of camera 16, to contact the planar surface of disk 42 adjacent the circumferential edge thereof. Shaft 23 rotatably mounts camera 16 and disk 42 on housing 50 of the motor assembly in FIG. 4. Ceramic motor 20a includes a spring 52a which biases fingertip 48a into contact with the planar surface of disk 42. Ceramic motor 20b is similarly constructed to position its fingertip (not shown) against the planar surface of disk 42 at a point diametrically opposite the point of contact of fingertip 46a.

An ac voltage applied across a first diagonally opposite pair of the electrodes of each of the ceramic motors 20a and 20b, causes the fingertips of the motors to move in small elliptical paths, causing repeated slight rotation of disk 42 in a first direction, and so rotating camera 16 in this direction. If an ac voltage is applied across the other diagonally opposite pair of the electrodes of ceramic motors 20a, 20b, the fingertips move in small elliptical paths in the opposite direction, rotating disk 42 and camera 16 in the opposite direction. Thus, camera 16 can be rotated to a desired position.

In the embodiment of FIG. 2, position control input device 28 might cause system controller 26 to always apply a voltage across the same pair of electrodes of motor 20, thus always rotating disk 42 and camera 16 in the same direction. Alternatively, controller 20 might be programmed so that if a predetermined interval of time passes between consecutive input pulses from position control input device 28, the controller changes the pair of electrodes to which the voltage is applied, causing rotation in the opposite direction. Likewise, a direction control input device might be provided, if desired, or other direction control techniques might be utilized.

Figure 5:
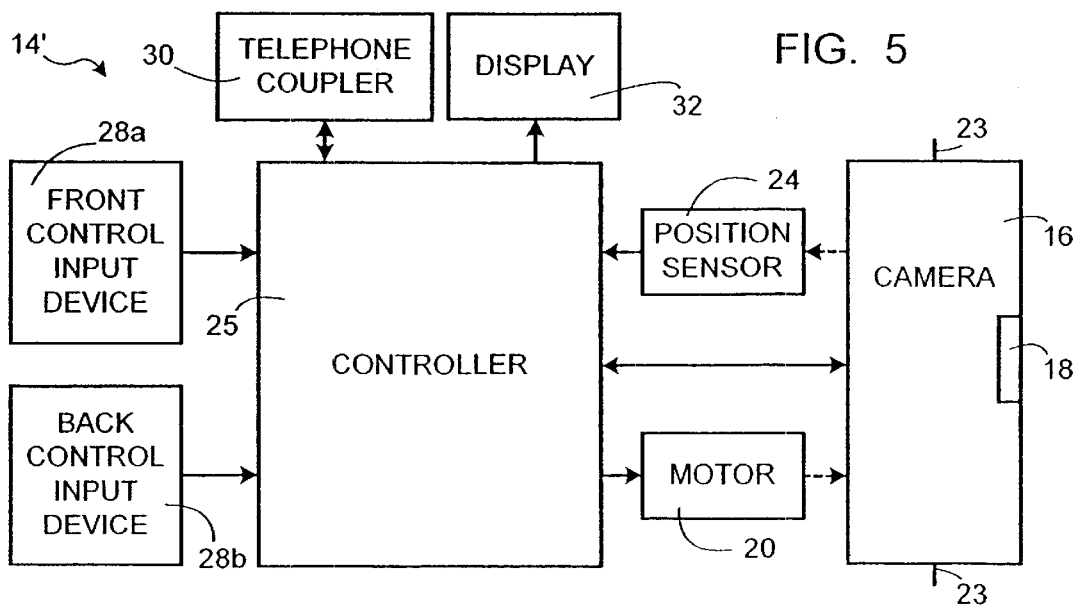
FIG. 5 is a block diagram of a second embodiment of a camera unit suitable for use in the video telecommunications device of FIG. 1 in accordance with the present invention.

FIG. 5 illustrates an alternative embodiment in which separate front and back position control input devices 28a, 28b are provided to permit selection of the direction of rotation of camera 16, to bring the lens 18, either toward the front or toward the back of the camera. FIG. 5 also illustrates that motor controller 22 and system controller 26 can be consolidated into a single controller 25. Controller 25, or controllers 22 and 26, can be a properly programmed processor, for example.

Ceramic motor 20 is small and light weight and has low power requirements, making such a motor well suited for use in a video telecommunications device in accordance with the present invention, particularly when the telecommunications device is a wireless phone. If a larger telecommunications device, such as a desk phone, is to be used, then a ceramic motor is still advantageous, but alternatively a stepper motor or a solenoid might be used in accordance with the present invention, particularly if a power supply is available, rather than a battery.

The present invention thus provides a video telecommunication device capable of rapidly rotating a video camera to a desired position so as to provide a desired video image. Although the invention has been described with reference to preferred embodiments, various alterations, rearrangements, and substitutions might be made, and still the result would be within the scope of the invention.

What is claimed is:

1. A video telecommunications device, comprising:
   a wireless telephone;
   a camera having a lens to sense an image;
   a ceramic motor connected to said camera and mounted on said wireless telephone to permit rotation of said camera on said wireless telephone;

a position sensor to sense the rotational position of said camera on said wireless telephone;

a control device to provide a control signal indicating a desired rotational position for said camera on said wireless telephone;

a controller, responsive to the control signal and the sensed position of said camera, to cause said motor to rotate said camera to the desired rotational position on said wireless telephone; and a telecommunications coupler coupling said camera to said wireless telephone to enable said wireless telephone to communicate the image sensed by said camera lens to a receiving telecommunications device.

2. A video telecommunications device as claimed in claim 1, further comprising a video display device to display a video image received by the wireless telephone.

3. A video telecommunication device as claimed in claim 2, wherein said video display device comprises a thin film transistor display device.

4. A video telecommunications device as claimed in claim 2, wherein said video display device comprises a liquid crystal display device.

5. A video telecommunications device as claimed in claim 1, wherein said ceramic motor includes a rotatably mounted disk coupled to said camera, and a piezoelectric element having a plurality of electrodes and a fingertip, and said piezoelectric element is responsive to application of an electrical voltage across a first pair of said electrodes to cause said fingertip to rotate said disk in a first direction, rotating said camera in the first direction, and is responsive to application of an electrical voltage across a second pair of said electrodes to cause said fingertip to rotate said disk in a second direction, opposite the first direction, rotating said camera in the second direction.

6. A video telecommunications device as claimed in claim 5, wherein the fingertip contacts a peripheral edge of said disk.

7. A video telecommunications device as claimed in claim 6, wherein said fingertip is aligned radially with respect to said disk.

8. A video telecommunications device as claimed in claim 5, wherein the fingertip contacts a planar surface of said disk.

9. A video telecommunications device as claimed in claim 8, wherein said fingertip is aligned axially with respect to said disk.

10. A video telecommunications device as claimed in claim 1, wherein said camera comprises a CCD camera.

11. A video telecommunications device as claimed in claim 1, wherein said camera comprises a CMOS camera.

12. A video telecommunications device as claimed in claim 1, wherein said control device generates a control signal having a duration determined by the duration of actuation of said control device, and wherein said controller is responsive to a control signal of less than a predetermined duration to rotate said camera a fixed amount and is responsive to a control signal of greater than the predetermined duration to rotate said camera to a predetermined position.

13. A video telecommunications device as claimed in claim 1, wherein said control device comprises a first position control input device to provide a first control signal to cause said controller to rotate said camera in a first direction, and a second position control input device to provide signal to cause said controller to rotate said camera in a second direction, opposite the first direction.

* * * * *